United States Patent
Niwa et al.

(10) Patent No.: US 7,311,334 B2
(45) Date of Patent: Dec. 25, 2007

(54) SHOCK ABSORBING TYPE STEERING DEVICE FOR VEHICLES AND METHOD OF PRODUCING THE SAME

(75) Inventors: Ken Niwa, Okazaki (JP); Noboru Minamoto, Okazaki (JP); Shuzo Hirakushi, Nara (JP)

(73) Assignee: Koyo Seiko Co., Ltd., Osaka-Shi, Osaka (JP)

( * ) Notice: Subject to any disclaimer, the term of this patent is extended or adjusted under 35 U.S.C. 154(b) by 565 days.

(21) Appl. No.: 10/679,505

(22) Filed: Oct. 7, 2003

(65) Prior Publication Data
US 2004/0129104 A1    Jul. 8, 2004

(30) Foreign Application Priority Data
Oct. 8, 2002   (JP)  ............ P. 2002-295122

(51) Int. Cl.
*B62D 1/18* (2006.01)
(52) U.S. Cl. .................. 280/777; 188/374
(58) Field of Classification Search ............. 280/777; 188/371, 374
See application file for complete search history.

(56) References Cited

U.S. PATENT DOCUMENTS

| | | | | |
|---|---|---|---|---|
| 3,470,761 | A * | 10/1969 | Okamoto et al. | 74/492 |
| 4,572,022 | A * | 2/1986 | Mettler | 74/492 |
| 4,991,871 | A * | 2/1991 | Sadakata | 280/777 |
| 5,983,695 | A * | 11/1999 | Lutz | 72/370.19 |
| 6,015,350 | A * | 1/2000 | Breese | 464/162 |
| 6,109,652 | A * | 8/2000 | Kim et al. | 280/777 |
| 6,484,384 | B1 * | 11/2002 | Gibson et al. | 29/516 |
| 6,896,290 | B2 * | 5/2005 | Lutz | 280/777 |
| 2002/0079686 | A1 * | 6/2002 | Kondou et al. | 280/777 |
| 2004/0104567 | A1 * | 6/2004 | Kinme et al. | 280/777 |
| 2006/0001249 | A1 * | 1/2006 | Fargeas et al. | 280/777 |

FOREIGN PATENT DOCUMENTS

| | | |
|---|---|---|
| AU | A 29955/77 | 4/1979 |
| EP | 0 713 820 A1 | 5/1996 |
| JP | 10-203381 | 8/1998 |
| WO | WO 02/38430 A1 | 5/2002 |

OTHER PUBLICATIONS

European Search Report dated Feb. 5, 2004.
J. Banshoya, et., "Energy-Absorbing Steering Column For Small Cars Utilizes Friction and Plastic Deformation", SAE Journal, vol. 76, No. 7, Jul. 1, 1968, pp. 36-38, XP002000032.

* cited by examiner

*Primary Examiner*—Paul N. Dickson
*Assistant Examiner*—Leonard McCreary, Jr.
(74) *Attorney, Agent, or Firm*—McGinn IP Law Group, PLLC (57) ABSTRACT

A shock absorbing type steering device decreases variations in press fitting loads corresponding to a friction force between two columns. A shock can be appropriately absorbed by relative movements of the two columns in an axial direction. At least one of a first column and a second column press fitted into an opening at one end of the first column is formed with swaged parts on a peripheral wall thereof at a plurality of positions having intervals in a circumferential direction of the column, respectively at a plurality of positions having intervals in an axial direction of the column. Positions of tip ends of the swaged parts are different between a group of swaged parts near the opening at the end of the first column and other groups remote from the opening.

10 Claims, 7 Drawing Sheets

PRIOR ART

SHOCK ABSORBING TYPE STEERING DEVICE FOR VEHICLES AND METHOD OF PRODUCING THE SAME

BACKGROUND OF THE INVENTION

1. Field of the Invention

The present invention relates to a shock absorbing type steering device to be employed for absorbing a shock which will attack a driver in the event of collision of vehicles, and a method of producing the same.

2. Description of the Related Art

There has been heretofore used a shock absorbing type steering device having a first column in a cylindrical shape and a second column in a cylindrical shape which is press fitted into an opening at one end of the first column, and adapted to absorb a shock in the event of collision of a driver with a steering wheel mounted on a steering shaft which is covered with the two columns, by relative movements of the two columns in an axial direction.

In the shock absorbing type steering device as described above, the shock will be absorbed by friction force acting between the two columns when the first column and the second column move in an axial direction relative to each other. Therefore, in case where such shock absorbing type steering devices are manufactured in mass production, variations in loads of press fitting the second column to the first column corresponding to the friction force between the two columns must be minimized, so that the shock can be appropriately absorbed. Such variations in the press fitting loads can be minimized by decreasing dimensional tolerance of an inner diameter of the first column or an outer diameter of the second column. However, in order to decrease such dimensional tolerance, it is necessary to accurately work with an inner periphery of the first column or an outer periphery of the second column, and working cost will be increased.

Under the circumstances, it is considered that the first column is provided with swaged parts which are arranged in a row in a circumferential direction of the column on a peripheral wall thereof, respectively at two positions spaced in an axial direction of the column, and thereafter, the second column is press fitted into an opening at one end of the first column so as to press the two columns to each other by way of the swaged parts (Patent document No. 1). Because it is easier to accurately swage so that the dimensional tolerance of swaging depth may be decreased, as compared with a case of accurately working with the inner periphery of the first column or the outer periphery of the second column, variations in the press fitting loads can be minimized at a low cost.

[Patent Document No. 1]

Japanese Patent Publication No. JP-A-10-203381

Figure 6:
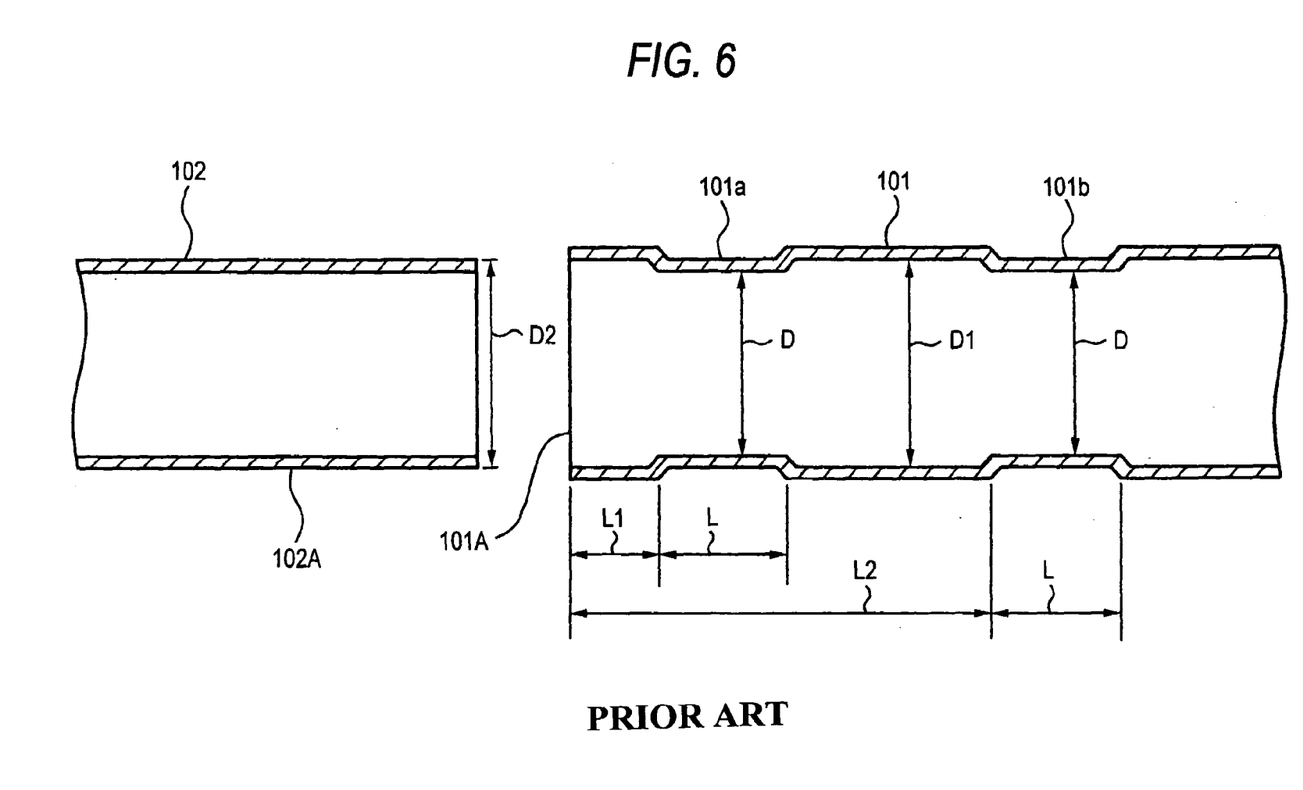
FIG. 6 is a longitudinal sectional view of a first column and a second column of the conventional shock absorbing type steering device.

However, in the conventional structure in which the swaged parts have been formed as described above, it has been impossible to sufficiently decrease those variations in the press fitting loads. Specifically, in the conventional structure, there have been formed swaged parts 101a, 101b which are arranged in a row in a circumferential direction of the column, on a peripheral wall of a first column 101 made of steel, respectively at two positions spaced in an axial direction of the column, as shown in FIG. 6, and thereafter, a second column 102 made of steel has been press fitted into an opening 101A at one end of the first column 101. In this case, a diameter D of a circle defined by tip ends of the swaged parts 101a positioned close to the opening 101A has been made equal to a diameter D of a circle defined by tip ends of the swaged parts 101b positioned remote from the opening 101A.

Figure 7:
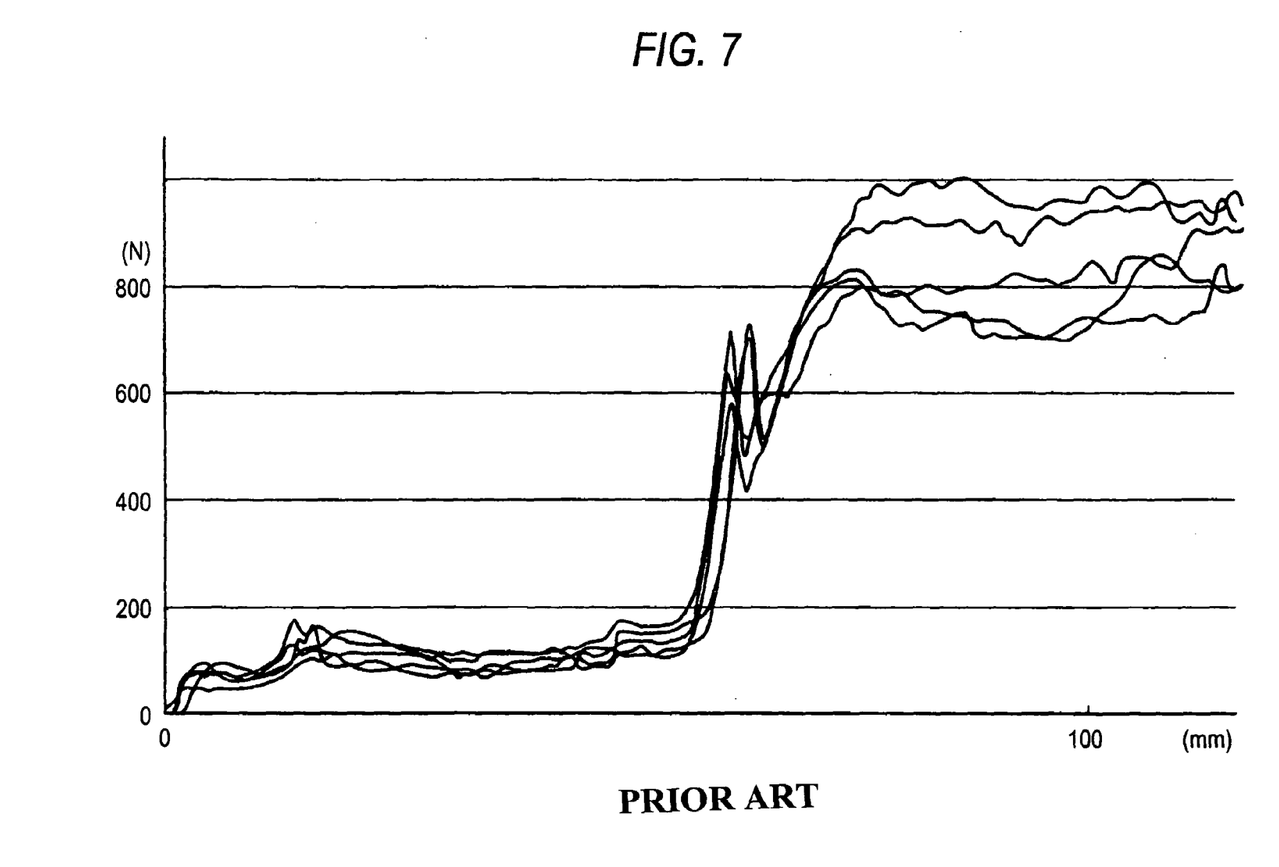
FIG. 7 is a graph showing relation between strokes and press fitting loads of the second column on occasion of press fitting into the first column in the conventional shock absorbing type steering device.

FIG. 7 is a graph showing relation between strokes and press fitting loads of the second column 102 with respect to the first column 101 on occasion of press fitting in the conventional case, as results obtained in five samples. In this case, the swaged parts 101a, 101b were formed at eight positions in a circumferential direction, respectively at two positions spaced in an axial direction of the column. An inner diameter D1 of the first column 101 was 34.06 mm, an outer diameter D2 of the second column 102 was 33.115 mm, the diameter D of the circles defined by the tip ends of the swaged parts 101a, 101b was 31.82 mm, a thickness of each of the columns 101, 102 was 2.0 mm, an axial length L of each of the swaged parts 101a, 101b was 13.8 mm, a distance L1 from the opening 101A to the swaged parts 101a close to the opening was 2.6 mm, and a distance L2 from the opening 101A to the swaged parts 101b remote from the opening was 49.6 mm. The press fitting loads in the five samples have slightly increased when the swaged parts 101a at the position close to the opening 101A of the first column have been pressed onto the outer periphery of the second column 102, and have largely increased when the swaged parts 101b at the position remote from the opening 101A have been pressed onto the outer periphery of the second column 102. It has been recognized that when the swaged parts 101b at the position remote from the opening 101A have been pressed onto the outer periphery of the second column 102, variations in the press fitting loads have amounted to 300N at most. An object of the present invention is to provide a shock absorbing type steering device in which such variations in press fitting loads can be decreased, and a method of producing the same.

SUMMARY OF THE INVENTION

According to the invention, there is provided a shock absorbing type steering device comprising a first column in a cylindrical shape, and a second column in a cylindrical shape which is press fitted into an opening at one end of the aforesaid first column, at least one of the aforesaid first column and aforesaid second column being provided with swaged parts which are formed on a peripheral wall thereof at a plurality of positions having intervals in a circumferential direction of the column, respectively at a plurality of positions having intervals in an axial direction of the column, the first and second columns being pressed to each other by way of the aforesaid swaged parts, whereby a shock in an event of collision of a driver with a steering member mounted on a steering shaft which is covered with the two columns is absorbed by relative movements of the two columns in the axial direction, characterized in that there is provided a difference in positions of tip ends of the aforesaid swaged parts in a diametrical direction of the column, between a position close to the opening at the end of the aforesaid first column and a position remote from the opening, so that a difference in mutual pressing forces of the two columns by way of the aforesaid swaged parts between the position close to the opening and the position remote from the opening may become small.

The inventors of the invention have investigated reasons for the variations in the press fitting loads when the second column 102 is press fitted to the first column 101 in the conventional structure as shown in FIG. 6, and have come to achieve this invention. Specifically, in the conventional structure, a swaging depth of the swaged parts 101a positioned close to the opening 101A of the first column has been made equal to a swaging depth of the swaged parts 101b positioned remote from the opening 101A. Accordingly, in case where the second column 102 is press fitted into the opening 101A of the first column 101, since rigidity of the peripheral wall of the first column 101 becomes smaller as approaching the opening 101A, mutual pressing forces between the columns 101 and 102 by way of the swaged parts 101a close to the opening 101A is smaller than the mutual pressing forces between the columns 101 and 102 by way of the swaged parts 101b remote from the opening 101A. In other words, the press fitting loads are larger at the position remote from the opening 101A than at the position close to the opening 101A, and the variations in the press fitting loads will be increased, as the press fitting loads themselves become larger. This means that unbalanced shares of the press fitting loads between the swaged parts 101a positioned close to the opening 101A and the swaged parts 101b positioned remote from the opening 101A have been a reason for the variations in the press fitting loads.

By contrast, according to the invention, a difference between the mutual pressing forces of the two columns by way of the swaged parts close to the opening of the first column and the mutual pressing forces of the two columns by way of the swaged parts remote from the opening is made small. With this structure, the shares of the press fitting loads can be equalized between the swaged parts close to the opening of the first column and the swaged parts remote from the opening of the first column, and the variations in the press fitting loads relative to the friction force between the two columns which is necessary for absorbing a shock can be decreased. In addition, this can be attained only by providing a difference in positions of the tip ends of the swaged parts in a diametrical direction of the column, between the position close to the opening of the first column and the position remote from the opening, and therefore, the variations in the press fitting loads can be easily and reliably decreased.

Preferably, regions in which the aforesaid swaged parts are formed and regions to be pressed by the aforesaid swaged parts in the aforesaid first column and aforesaid second column are along a cylindrical face having a constant diameter, in a state prior to formation of the aforesaid swaged parts, and swaging depths of the aforesaid swaged parts are made larger at the position close to the opening at the end of the aforesaid first column than at the position remote from the opening. In this manner, the variations in the press fitting loads which are necessary for absorbing a shock can be easily decreased.

On occasion of producing the shock absorbing type steering device according to the invention, the aforesaid second column is preferably press fitted into the opening at the end of the aforesaid first column, after the aforesaid swaged parts have been formed. In this manner, it is possible to confirm, on occasion of assembling, the press fitting loads corresponding to the friction force between the two columns which is necessary for absorbing a shock, and quality of the product can be reliably maintained.

In the figures, the reference numeral 4 refers to a steering shaft; 5 to a steering wheel; 7 to a first column; 7A an opening at one end; 8 to a second column; and each of 40a and 40b to a swaged part.

DETAILED DESCRIPTION OF THE PREFERRED EMBODIMENTS

Figure 1:
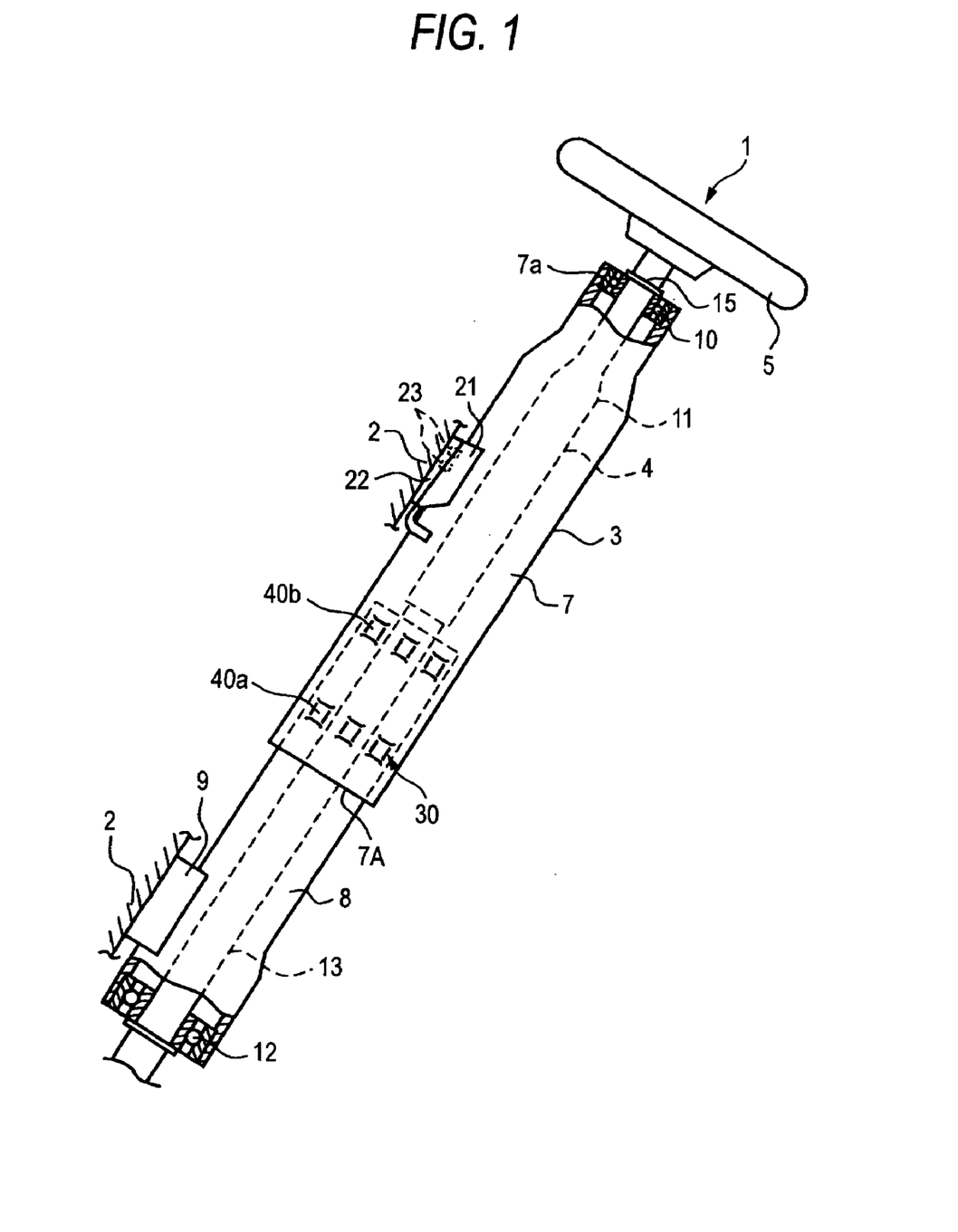
FIG. 1 is a side view of a shock absorbing type steering device in an embodiment of the invention.

A shock absorbing type steering device 1 as shown in FIG. 1 includes a cylindrical column 3 supported by a vehicle body 2, a steering shaft 4 supported by the column 3, and a steering wheel 5 which functions as a steering member mounted on the steering shaft 4. The column 3 has a first column 7 made of steel in a stepped cylindrical shape and a second column 8 made of steel in a stepped cylindrical shape whose one end portion is adapted to be press fitted into an opening 7A at one end of the first column 7. The steering shaft 4 is covered with the first column 7 and the second column 8, and includes a first shaft 11 which is supported by the first column 7 by way of a first bearing 10 and a second shaft 13 which is supported by the second column 8 by way of a second bearing 12.

The steering wheel 5 is mounted on one end of the first shaft 11. The other end of the first shaft 11 and one end of the second shaft 13 are engaged with each other in such a manner that rotation can be transmitted to each other and relative movements in an axial direction may be possible, due to their noncircular shapes in cross section, for example. Wheels are connected to the other end of the second shaft 13 by way of steering gears such as rack-pinion type steering gears. With this structure, rotation of the steering wheel 5 is transmitted to the wheels from the steering shaft 4 by way of the steering gears, thereby to change a steering angle.

A retaining ring 15 fitted around the first shaft 11 is in contact with an inner ring of the first bearing 10, and an outer ring of the first bearing 10 is in contact with a step 7a which is formed on an inner periphery of the first column 7. In this manner, the first shaft 11 and the first column 7 can move in association along an axial direction toward the wheels.

The first column 7 is connected to the vehicle body 2, and the connection will be released by a shock in the event of collision of a driver with the steering wheel 5. In the present embodiment, an upper bracket 21 is fixed to the first column 7, and the upper bracket 21 is connected to a connecting member 22 fixed to the vehicle body 2 by means of a pin 23 made of synthetic resin. When the pin 23 is broken by an action of the shock, the connection will be released. When the connection has been released, the first column 7 can relatively move toward the wheels with respect to the vehicle body 2 along the axial direction.

The second column 8 is fixed to the vehicle body 2 by way of a lower bracket 9. Accordingly, due to a shock in the event of collision of the driver with the steering wheel 5, the first shaft 11 and the first column 7 relatively move in association in the axial direction with respect to the vehicle body 2, the first shaft 11 relatively moves in the axial direction with respect to the second shaft 13, and the first column 7 relatively moves in the axial direction with respect to the second column 8.

Figure 2:
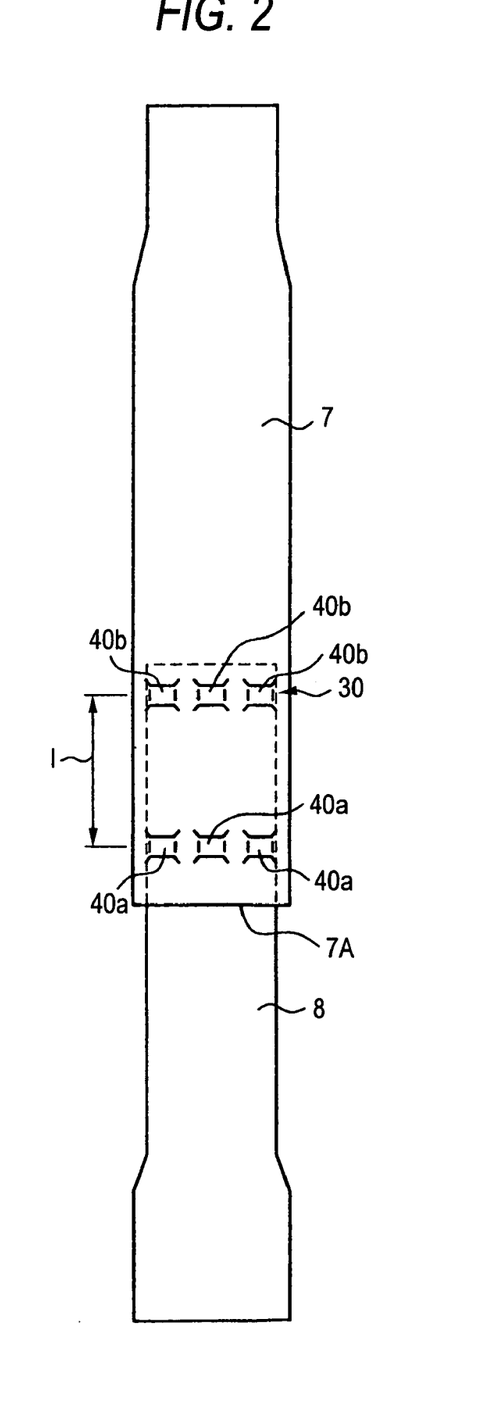
FIG. 2 is a side view of a first column and a second column of the shock absorbing type steering device in the embodiment of the invention.
Figure 3:
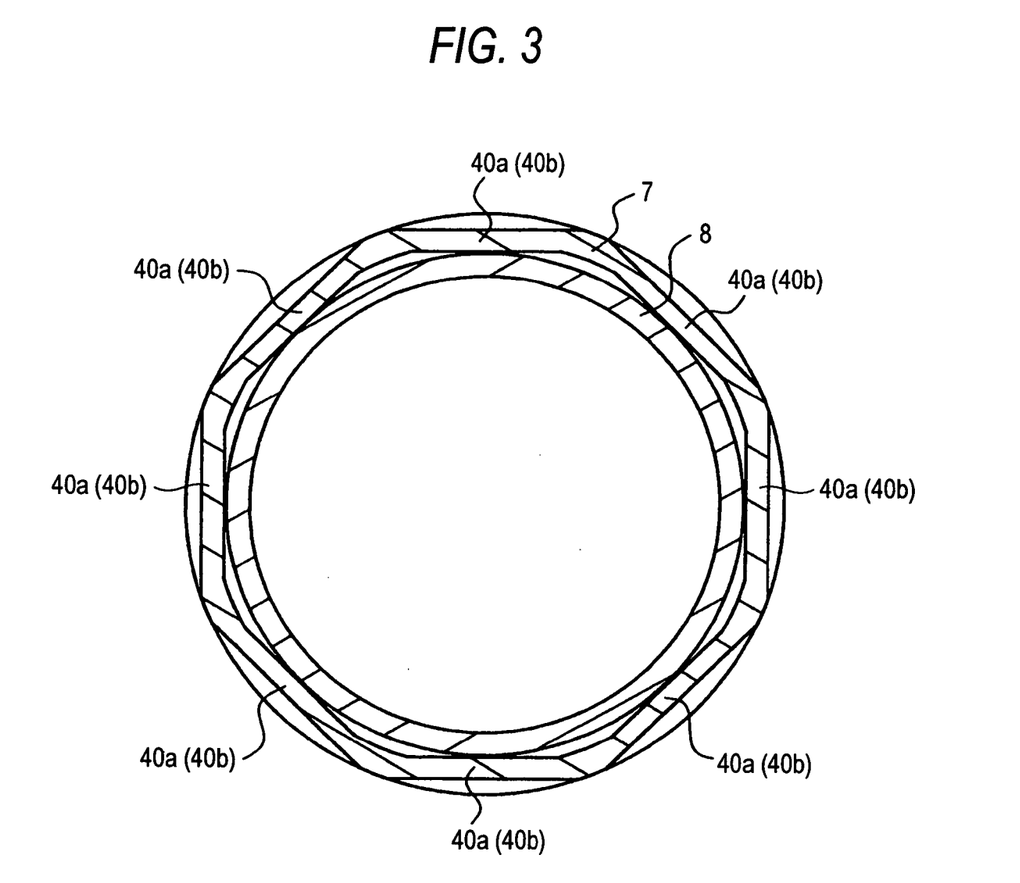
FIG. 3 is a cross sectional view of the first column and the second column of the shock absorbing type steering device in the embodiment of the invention.

There is provided a shock absorbing mechanism 30 for absorbing a shock in the event of collision of the driver with the steering wheel 5, by relative movements in the axial direction of the first column 7 and the second column 8. Specifically, as shown in FIGS. 2 and 3, the first column 7 is provided on its peripheral wall with swaged parts 40a, 40b at a plurality of positions having an interval I in the axial direction of the column, respectively at two positions in this embodiment, and at a plurality of positions having intervals in the circumferential direction of the column, at eight positions having an equal interval in the circumferential direction of the column in this embodiment. Relative positions in the circumferential direction of the swaged parts 40a positioned close to the opening 7A at one end of the first column 7 with respect to the first column 7 and relative positions in the circumferential direction of the swaged parts 40b positioned remote from the opening 7A with respect to the first column 7 are made equal to each other. The swaged parts 40a and 40b are formed by swaging the peripheral wall of the first column 7 from outside so as to protrude inwardly. After the swaged parts 40a, 40b have been formed, the second column 8 is press fitted into the opening 7A at the end of the first column 7. As the results, the two columns 7, 8 are pressed to each other by way of the swaged parts 40a, 40b, and a friction force is exerted between the two columns 7, 8 when the two columns 7, 8 relatively move in the axial direction, thereby enabling the above described shock to be absorbed.

Figure 4:
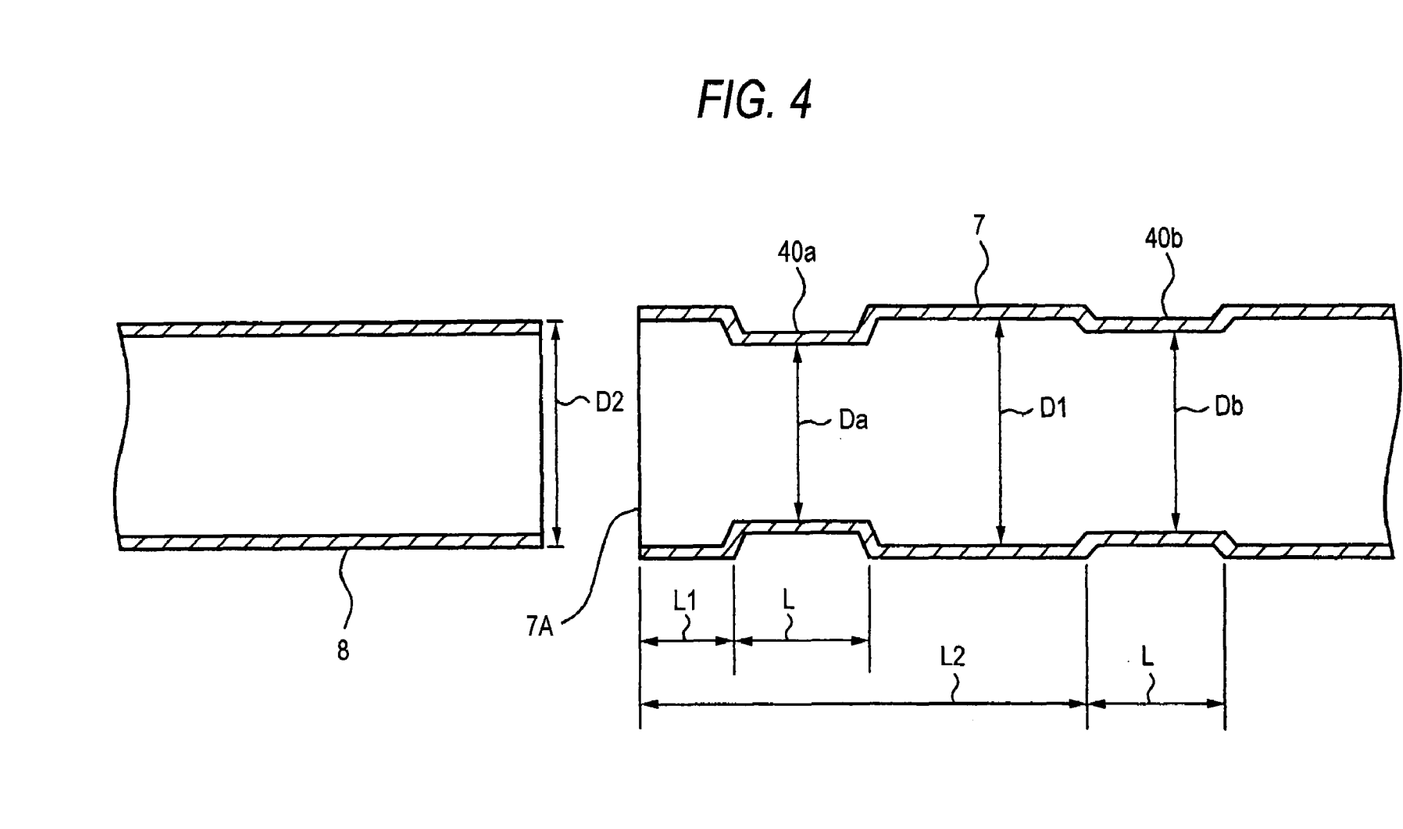
FIG. 4 is a longitudinal sectional view of the first column and the second column of the shock absorbing type steering device in the embodiment of the invention.

As shown in FIG. 4, there is provided a difference in positions of the tip ends of the swaged parts 40a, 40b in a diametrical direction of the column, between the position close to the opening 7A at the end of the first column 7 and the position remote from the opening 7A, so that a difference in the mutual pressing forces of the two columns 7, 8 by way of the swaged parts 40a, 40b between the position close to the opening 7A and the position remote from the opening 7A may become small. In the present embodiment, a region in the first column 7 in which the swaged parts 40a, 40b are formed and a region in the second column 8 to be pressed with the swaged parts 40a, 40b are along a cylindrical face having a constant diameter before the swaged parts 40a, 40b are formed, and a swaging depth of the swaged parts 40a at the position close to the opening 7A is made larger than that of the swaged parts 40b at the position remote from the opening 7A. In this manner, a diameter Da of a circle defined by the tip ends of the swaged parts 40a at the position close to the opening 7A at the end of the first column 7 is made smaller than a diameter Db of a circle defined by the tip ends of the swaged parts 40b at the position remote from the opening 7A. In the present embodiment, the swaging depths of the swaged parts 40a at the position close to the opening 7A are equal to each other, and also, the swaging depths of the swaged parts 40b at the position remote from the opening 7A are equal to each other.

Figure 5:
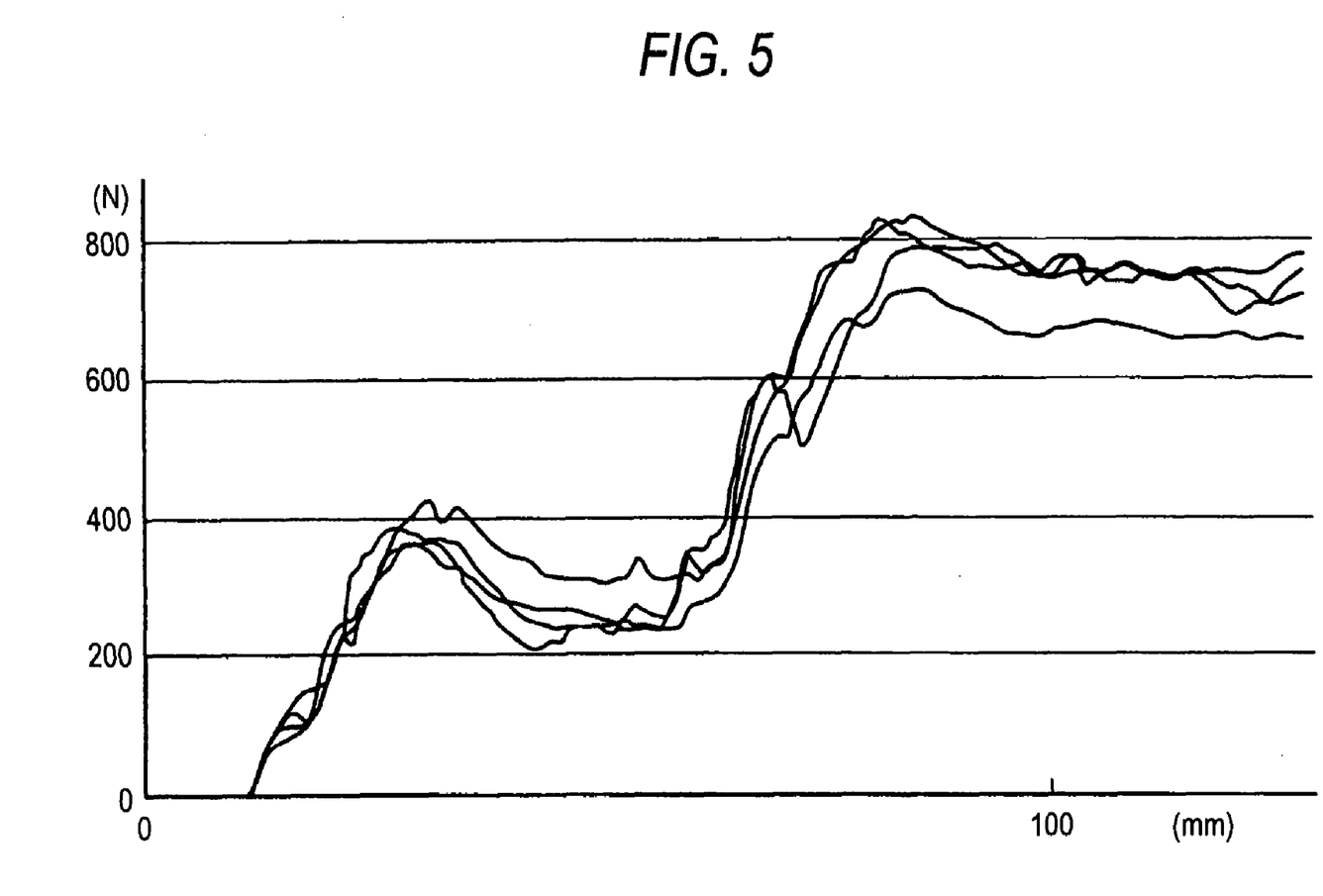
FIG. 5 is a graph showing relation between strokes and press fitting loads of the second column on occasion of press fitting into the first column in the shock absorbing type steering device in the embodiment of the invention.

FIG. 5 is a graph showing relation between strokes and press fitting loads of the second column 8 with respect to the first column 7 on occasion of press fitting in the above described embodiment, as the results obtained in four samples. An inner diameter D1 of the first column 7 is 34.1 mm, an outer diameter D2 of the second column 8 is 33.115 mm, the diameter Da of the circle defined by the tip ends of the swaged parts 40a at the position close to the opening 7A is 32.44 mm, the diameter Db of the circle defined by the tip ends of the swaged parts 40b at the position remote from the opening 7A is 32.52 mm, a thickness of each of the columns 7, 8 is 2 mm, an axial length L of each of the swaged parts 40a, 40b is 13.8 mm, a distance L1 from the opening 7A to the swaged parts 40a close to the opening 7A is 2.6 mm, and a distance L2 from the opening 7A to the swaged parts 40b remote from the opening 7A is 49.6 mm. The press fitting loads in the four samples increase when the swaged parts 40a at the position close to the opening 7A at the end of the first column 7 are pressed onto the outer periphery of the second column 8, and increase to the substantially same extent when the swaged parts 40b at the position remote from the opening 7A are pressed onto the outer periphery of the second column 8. When the swaged parts 40b at the position remote from the opening 7A are pressed onto the outer periphery of the second column 8, variations in the press fitting loads are less than 200N at most, and it has been confirmed that the variations in the press fitting loads have decreased as compared with the conventional case.

According to the above described structure, the difference between the mutual pressing forces of the two columns 7, 8 by way of the swaged parts 40a close to the opening 7A at the end of the first column 7 and the mutual pressing forces of the two columns 7, 8 by way of the swaged parts 40b remote from the opening 7A is made small. With this structure, the shares of the press fitting loads can be equalized between the swaged parts 40a close to the opening 7A at the end of the first column 7 and the swaged parts 40b remote from the opening 7A, and the variations in the press fitting loads corresponding to the friction force between the two columns 7, 8 which is necessary for absorbing a shock can be decreased. In addition, this can be attained only by providing a difference in the positions of the tip ends of the swaged parts 40a, 40b in the diametrical direction of the column, between the position close to the opening 7A at the end of the first column 7 and the position remote from the opening 7A, and therefore, the variations in the press fitting loads can be easily and reliably decreased. Particularly, due to the structure as in the above described embodiment in which it would be sufficient to provide only the difference between the swaging depths of the swaged parts 40a and 40b, the variations in the press fitting loads can be more easily decreased. Moreover, by press fitting the second column into the opening 7A at the end of the first column 7 after the swaged parts 40a, 40b have been formed, it is possible to confirm, on occasion of assembling, the press fitting loads corresponding to the friction force between the two columns 7, 8 which is necessary for absorbing a shock, and quality of the product can be reliably maintained.

The invention is not limited to the above described embodiment.

For example, the swaged parts may be formed respectively at three positions or more having intervals in the axial direction of the column. Number of the swaged parts to be formed respectively at a plurality of positions having intervals in the axial direction of the column is not limited too. In case where the swaged parts are formed respectively at three positions or more having intervals in the axial direction of the column, the swaging depth of the swaged parts formed in the first column at the closest position to the opening of the first column may be made larger than the swaging depth of the swaged parts formed in the first column at the other positions remote from the opening of the first column. Alternatively, the swaging depths may be made gradually larger as departing from the opening.

Although the swaged parts are formed on the peripheral wall of the first column in the above described embodiment, the swaged parts which are arranged in a row in the circumferential direction of the column may be formed on the peripheral wall of the second column respectively at a plurality of positions having intervals in the axial direction of the column, along with the swaged parts on the peripheral wall of the first column or instead of the swaged parts on the peripheral wall of the first column. In case where the swaged parts are formed on the peripheral wall of the second column, the peripheral wall may be swaged from inside so as to protrude outwardly. In this case, a diameter of a circle defined by the tip ends of the swaged parts at the position close to the opening at the end of the first column may be made larger than a diameter of a circle defined by the tip ends of the swaged parts at the position remote from the opening.

Moreover, the swaging depth of only a portion of the swaged parts but not all the swaged parts at the position close to the opening of the first column may be made larger than the swaging depth of the swaged parts at the position remote from the opening of the first column.

Further, the swaging depth of the swaged parts formed in the first column may be made equal at both the positions close to and remote from the opening of the first column, and at the same time, the diameter of the first column before the swaged parts are formed may be made smaller at the position close to the opening than at the position remote from the opening. Alternatively, the swaging depth of the swaged parts formed in the second column may be made equal at both the positions close to and remote from the opening of the first column, and at the same time, the diameter of the second column before the swaged parts are formed may be made larger at the position close to the opening than at the position remote from the opening. In short, it would be sufficient that there is provided a difference in the positions of the tip ends of the swaged parts in the diametrical direction of the column, between the position close to and the position remote from the opening, so that the difference in the mutual pressing forces of the two columns by way of the swaged parts between the position close to the opening at the end of the first column and the position remote from the opening may become small.

According to the shock absorbing type steering device and the method of producing the same in the invention, the variations in the press fitting loads corresponding to the friction force between the two columns can be easily and reliably decreased, whereby the shock can be appropriately absorbed by the relative movements of the two columns in the axial direction.

What is claimed is:

1. A shock absorbing steering device comprising:
   a first column which is cylindrical-shaped;
   a second column is cylindrical-shaped and is press fitted into an opening at one end of said first column; and
   a shock absorber provided on an inner wall of said first column, said shock absorber including a first shock absorbing section having convex portions arranged on the inner wall with predetermined intervals in a circumferential direction of the column and a second shock absorbing section having convex portions arranged on the inner wall with predetermined intervals in a circumferential direction of the column;
   wherein said first shock absorbing section is provided nearer to the opening of said first column than said second shock absorbing section, and an inside diameter of said first shock absorbing section is different from an inside diameter of said second shock absorbing section, and
   wherein said inside diameter of said first shock absorbing section is smaller than said inside diameter of said second shock absorbing section.

2. A shock absorbing steering device according to claim 1,
   wherein said shock absorber is formed by swaged parts formed on a peripheral wall of said first column at a plurality of positions having intervals in a circumferential direction of the column, respectively at a plurality of positions having intervals in an axial direction of the column;
   wherein said first and second columns are pressed to each other by way of said swaged parts, and
   wherein positions of tip ends of said swaged parts in a diametrical direction of the column are different between said swaged parts close to the opening at the end of said first column and said swaged parts remote from the opening, such that a difference in mutual pressing forces of said two columns by way of said swaged parts between the position close to the opening and the position remote from the opening may become small.

3. The shock absorbing type-steering device according to claim 2,
   wherein regions in which said swaged parts are formed and regions to be pressed by said swaged parts in said first column and said second column are along a cylindrical face having a constant diameter, in a state prior to formation of said swaged parts, and
   wherein swaging depths of said swaged parts are made larger at the position close to the opening at the end of said first column than at the position remote from the opening.

4. A method of producing a shock absorbing steering device according to claim 3, wherein said second column is press fitted into the opening at the end of said first column, after said swaged parts have been formed.

5. A method of producing a shock absorbing steering device according to claim 1, wherein
   said second column is press fitted into the opening at the end of said first column, after said swaged parts have been formed.

6. The shock absorbing steering device according to claim 1,
   wherein said shock absorber further includes a third shock absorbing section provided in between said first and second shock absorbing sections, said third shock absorbing section having convex portions arranged on the inner wall with predetermined intervals in a circumferential direction of the column, and
   wherein an inside diameter of said third shock absorbing section is different from at least one of said inside diameter of said first shock absorber and said inside diameter of said second shock absorber.

7. A shock absorbing steering device comprising:
   a first column which is cylindrical-shaped;
   a second column which is cylindrical-shaped and is press fitted into an opening at one end of said first column; and a shock absorber provided on an outer wall of said second column, said shock absorber including a first shock absorbing section having convex portions arranged on the outer wall with predetermined intervals in a circumferential direction of the second column and a second shock absorbing section having convex portions arranged on the outer wall with predetermined intervals in a circumferential direction of the second column;

wherein said first shock absorbing section is provided in nearer to the opening of said first column than said second shock absorbing section, and an external diameter of said first shock absorbing section is different from an external diameter of said second shock absorbing section.

8. The shock absorbing steering device according to claim 7, wherein said external diameter of said first shock absorbing section is larger than said external diameter of said second shock absorbing section.

9. The shock absorbing steering device according to claim 7, wherein said shock absorber further includes a third shock absorbing section provided in between said first and second shock absorbing sections, said third shock absorbing section having convex portions arranged on the outer wall with predetermined intervals in a circumferential direction of the column, and wherein an external diameter of said third shock absorbing section is different from at least one of said external diameter of said first shock absorbing section and said external diameter of said second shock absorbing section.

10. A method of producing a shock absorbing type steering device according to claim 7, wherein said second column is press fitted into the opening at the end of said first column, after said swaged parts have been formed.

* * * * *